UNITED STATES PATENT OFFICE.

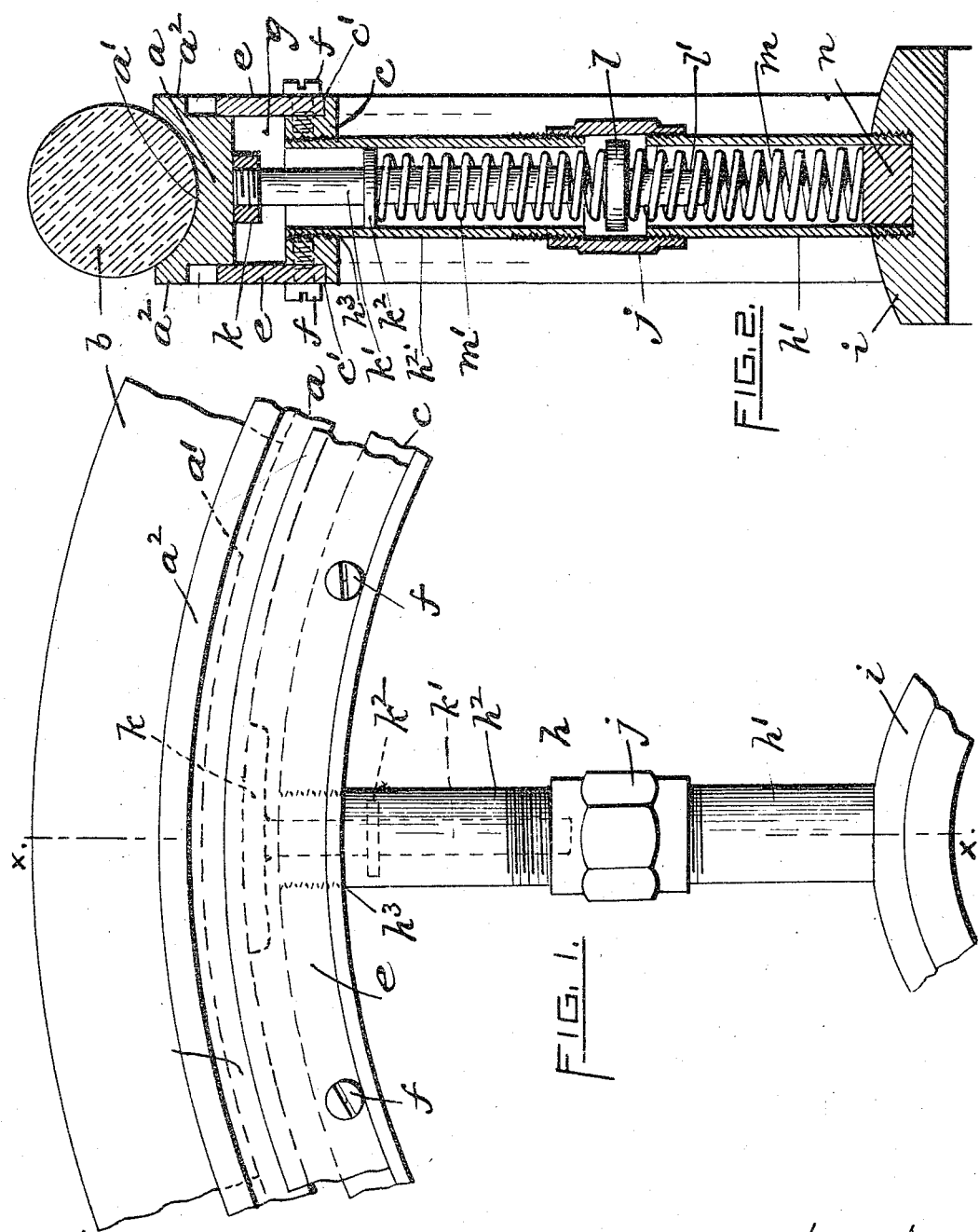

BENJAMIN A. DENNIS, OF PROVIDENCE, RHODE ISLAND, ASSIGNOR TO THOMAS A. McGRATH, OF PROVIDENCE, RHODE ISLAND.

VEHICLE-WHEEL.

1,014,131.   Specification of Letters Patent.   Patented Jan. 9, 1912.

Application filed February 9, 1911. Serial No. 607,563.

*To all whom it may concern:*

Be it known that I, BENJAMIN A. DENNIS, a citizen of the United States, residing at the city of Providence, in the county of Providence and State of Rhode Island, have invented certain new and useful Improvements in Vehicle-Wheels, of which the following is a specification.

This invention relates to an improved cushion means for vehicle wheels, particularly adapted for heavy vehicles, and has for its object to provide a wheel of such class in a manner as hereinafter set forth with means for absorbing shock when the vehicle is traveling over an uneven road surface or meets with an obstruction.

Although the wheel is designed primarily for use in connection with heavy vehicles, yet it is to be understood that it can be employed for vehicles of any weight.

Further objects of the invention are to provide a cushion wheel which is comparatively simple in its construction, and arrangement, strong, durable, efficient in its use, and comparatively inexpensive to manufacture.

With the foregoing and other objects in view, the invention consists of the novel construction and arrangement of parts, as hereinafter more specifically described and illustrated in the accompanying sheet of drawings, wherein is shown the preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts, and in which:

Figure 1 is a partial side elevation of a cushion wheel in accordance with this invention, and, Fig. 2 is a section on line $x$—$x$ of Fig. 1.

A cushion wheel in accordance with this invention comprises an annular rim $a$ provided with a concave seat $a^1$ to receive a solid rubber tire $b$, which is round in cross-section. This rim $a$ is formed at each side at its outer portion with a laterally-extending ledge $a^2$, whereby the inner portion of the rim $a$ will be of less width than the outer portion thereof. Concentric with the rim $a$ is a ring $c$, of lesser diameter than said rim, and said ring has a cutaway portion at each side in order to provide a laterally-extending shoulder, as at points $c^1$, $c^1$, against which flat annular flanges $e$, $e$ are positioned and secured by screws $f$, $f$ to said ring. These flanges $e$, $e$ have a sliding contact upon the side faces of the rim $a$, at the inner portion thereof, and thus a pocket $g$ is formed into which said rim projects.

This improved wheel includes a series of spokes of special construction, only one of which is shown, and each spoke, designated by reference letter $h$ as a whole, consists of an inner tube $h^1$, and an outer tube $h^2$. The tube $h^1$ is secured in any suitable manner to the vehicle-hub $i$, and the outer tube $h^2$ is screw-threaded for engagement in one of the spaced screw-threaded openings formed through the ring $c$, as at a point $h^3$, and the adjacent ends of both tubes $h^1$ and $h^2$ are also screw-threaded for engagement with a union $j$.

In the pocket $g$, of the wheel, is a series of sector blocks $k$, only one of which is shown, each block having its curved surface bearing against the rim $a$, and in each block is secured a rod $k^1$ which projects through and nearly the full length of the outer spoke-tube $h^2$, and said rod has an integral collar $k^2$ loosely fitting within said tube. Within the union $j$ is a disk $l$ having an integral projecting stem $l^1$. An expanding coil spring $m$ surrounds the stem $l^1$ and is interposed between the disk $l$ and a plug $n$, which is secured in the vehicle-hub $i$. An expanding coil spring $m^1$ surrounds the rod $k^1$ and is interposed between its collar $k^2$ and the disk $l$. The tendency of the springs $m$ and $m^1$ is to force the rim $a$ outwardly and thereby serve as a cushion for the tire $a$, when it travels over an uneven road surface or meets with an obstruction. The action of the springs $m$, $m^1$ effects a radial resiliency between the rim $a$ and hub $i$. The rim $a$ has a slight circumferential movement upon the series of sector blocks $k$, and the tire $b$ has also a slight circumferential creeping movement upon the bearing of said rim, and this complementary movement of the rim and the tire upon each other is to prevent wear of the elastic portion and keep the rubber uniform throughout its bearing contact upon said rim.

This construction of vehicle wheel, as described, permits the rim $a$; tire $b$; the ring $c$, and its spoke members $h^2$ being collectively disunited from the remainder of the wheel, by simply unscrewing the union $j$ from its spoke members $h^1$, so that a new coil spring $m$, $m^1$ and its adjunctive parts may be readily mounted in position whenever the occasion demands.

By my construction and arrangement of parts I provide a cushion means for a vehicle wheel that is effective in operation, and composed of comparatively few parts that may be readily assembled, and at the same time a structure that is durable and comparatively inexpensive to manufacture.

Having thus described my invention, what I claim and desire to secure by Letters-Patent, is:—

In a vehicle wheel, the combination with a rim formed with a laterally-extending ledge at each side and said rim provided with a concave seat to receive a solid rubber tire, a ring of lesser diameter than the rim and said ring having fixed annular flanges in sliding contact upon the side faces of said rim; a spoke composed of two tubes, one of which is secured in the ring and the other secured in the wheel-hub; a union connection for the inner ends of said tubes; a sector block whose curved surface rests against the rim and said block having a rod projecting into the outer tube and provided with an integral collar; a disk; an expanding coil spring interposed between the collar and said disk, a second expanding coil spring interposed between said disk and the wheel-hub.

In testimony whereof I affix my signature in presence of two witnesses.

BENJAMIN A. DENNIS.

Witnesses:
JAMES M. GILLRAIN,
JOHN M. CLIFFORD.